US008787490B2

(12) United States Patent
Lindblom et al.

(10) Patent No.: US 8,787,490 B2
(45) Date of Patent: *Jul. 22, 2014

(54) TRANSMITTING DATA IN A COMMUNICATION SYSTEM

(75) Inventors: Jonas Lindblom, Solna (SE); Renat Vafin, Tallinn (EE)

(73) Assignee: Skype, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/586,775

(22) Filed: Aug. 15, 2012

(65) Prior Publication Data

US 2012/0307677 A1      Dec. 6, 2012

Related U.S. Application Data

(63) Continuation of application No. 12/006,094, filed on Dec. 28, 2007, now Pat. No. 8,279,968.

(30) Foreign Application Priority Data

Mar. 20, 2007 (GB) .................................. 0705328.3

(51) Int. Cl.
*H04L 27/00* (2006.01)
(52) U.S. Cl.
USPC ......................................... 375/295; 375/132
(58) Field of Classification Search
USPC .......... 375/295, 132, 146; 704/201, 500, 501, 704/228, 230; 381/22, 23, 17, 18, 19, 46; 395/2, 35, 2.71; 700/94
See application file for complete search history.

(56) References Cited

U.S. PATENT DOCUMENTS

| 4,752,956 | A | 6/1988 | Sluijter |
| 5,353,408 | A | 10/1994 | Kato et al. |
| 6,289,313 | B1 | 9/2001 | Heinonen et al. |
| 6,546,515 | B1 | 4/2003 | Vary et al. |
| 6,757,654 | B1 | 6/2004 | Westerlund et al. |
| 7,394,903 | B2 | 7/2008 | Herre et al. |

(Continued)

FOREIGN PATENT DOCUMENTS

| CN | 101636950 | 1/2010 |
| EP | 1489599 | 12/2004 |

(Continued)

OTHER PUBLICATIONS

"International Search Report", Application No. PCT/IB2007/004558, (Mar. 13, 2009), 4 pages.

(Continued)

*Primary Examiner* — Shuwang Liu
*Assistant Examiner* — Helene Tayong
(74) *Attorney, Agent, or Firm* — Sonia Cooper; Jim Ross; Micky Minhas

(57) ABSTRACT

A signal to be transmitted from a terminal via a channel in a communication network is encoded by receiving the signal at the terminal; determining characteristics of the channel; encoding a first portion of the signal in accordance with a first encoding method to produce a first encoded signal portion; and encoding a second portion of the signal in accordance with a second encoding method to produce a second encoded signal portion. The first portion of the signal is encoded in accordance with the first encoding method depending on the determined characteristics of the channel. The first encoded signal portion and the second encoded signal portion are transmitted via the channel.

20 Claims, 4 Drawing Sheets

(56) References Cited

U.S. PATENT DOCUMENTS

| | | | |
|---|---|---|---|
| 7,720,676 | B2 | 5/2010 | Philippe et al. |
| 8,279,968 | B2 | 10/2012 | Lindblom et al. |
| 2004/0131015 | A1 | 7/2004 | Sung et al. |
| 2005/0053242 | A1 | 3/2005 | Henn et al. |
| 2006/0190247 | A1* | 8/2006 | Lindblom .............. 704/230 |
| 2006/0217975 | A1* | 9/2006 | Sung et al. ............ 704/228 |
| 2006/0265087 | A1* | 11/2006 | Philippe et al. .......... 700/94 |
| 2007/0204203 | A1* | 8/2007 | Chou et al. ............. 714/770 |
| 2007/0299669 | A1* | 12/2007 | Ehara .................... 704/262 |
| 2008/0027711 | A1 | 1/2008 | Rajendran et al. |
| 2008/0154615 | A1* | 6/2008 | Oomen et al. .......... 704/500 |
| 2008/0232508 | A1 | 9/2008 | Lindblom et al. |
| 2009/0070107 | A1* | 3/2009 | Kawashima et al. ..... 704/229 |
| 2009/0234645 | A1 | 9/2009 | Bruhn |

FOREIGN PATENT DOCUMENTS

| | | |
|---|---|---|
| WO | WO-2004040830 | 5/2004 |
| WO | WO-2005009019 | 1/2005 |
| WO | 2005043882 | 5/2005 |
| WO | 2007035147 | 3/2007 |
| WO | WO-2008114090 | 9/2008 |

OTHER PUBLICATIONS

"Written Opinion", Application No. PCT/IB2007/004558, (Sep. 20, 2009)11 pages.

"Non Final Office Action", U.S. Appl. No. 12/006,094, (Oct. 5, 2011), 17 pages.

"Notice of Allowance", U.S. Appl. No. 12/006,094, (May 29, 2012), 12 pages.

"Foreign Office Action", Chinese Application No. 200780052274.3, (May 14, 2012), 9 pages.

"Foreign Office Action", Russian Application No. 2009138477, (May 4, 2011), 8 pages.

* cited by examiner

US 8,787,490 B2

TRANSMITTING DATA IN A COMMUNICATION SYSTEM

RELATED APPLICATIONS

This application is a continuation of and claims priority to U.S. patent application Ser. No. 12/006,094, entitled "Method of Transmitting Data in a Communication System", filed on Dec. 28, 2007, which claims priority under 35 U.S.C. §119 or 365 to Great Britain, Application No. 0705328.3, filed Mar. 20, 2007, the disclosures of which are incorporated herein by reference in their entirety.

BACKGROUND

In a communication system a communication network is provided, which can link together two communication terminals so that the terminals can send information to each other in a call or other communication event. Information may include speech, text, images or video.

Modern communication systems are based on the transmission of digital signals. Analogue information such as speech is input into an analogue to digital converter at the transmitter of one terminal and converted into a digital signal. The digital signal is then encoded and placed in data packets for transmission over a channel to the receiver of another terminal.

Each data packet includes a header portion and a payload portion. The header portion of the data packet contains data for transmitting and processing the data packet. This information may include an identification number and source address that uniquely identifies the packet, a header checksum used to detect processing errors and the destination address. The payload portion of the data packet includes information from the digital signal intended for transmission. This information may be included in the payload as encoded frames such as voice frames, wherein each frame represents a portion of the analogue signal.

Degradations in the channel on which the information is sent will affect the information received at the receiver. Degradations in the channel can cause changes in the packet sequence, delay the arrival of some packets at the receiver and cause the loss of other packets. The degradations may be caused by channel imperfections, noise and overload in the channel. This ultimately results in a reduction of the quality of the signal output by the receiving terminal.

One type of communication network suitable for transmitting digital information is the internet. Protocols which are used to carry voice signals over an Internet Protocol network are commonly referred to as Voice over IP (VoIP). VoIP is the routing of voice conversations over the Internet or through any other IP-based network.

Channels which route information via the internet are particularly susceptible to degradation. Known methods for overcoming channel degradation employ the use of encoding schemes that generate signals that are particularly robust to degradations in the channel. However encoding a signal using such encoding schemes will remove some of the information from the signal. As such the quality of the received signal is reduced.

SUMMARY

In a first embodiment, there is provided a method of encoding a signal to be transmitted from a terminal via a channel in a communication network comprising: receiving the signal at the terminal; determining characteristics of the channel; encoding a first portion of the signal in accordance with a first encoding method to produce a first encoded signal portion; encoding a second portion of the signal in accordance with a second encoding method to produce a second encoded signal portion; wherein the first portion of the signal encoded in accordance with the first encoding method is dependent on the determined characteristics of the channel; and transmitting the first encoded signal portion and the second encoded signal portion via the channel.

In a second embodiment, there is provided a device arranged to encode a signal to be transmitted from a terminal via a channel in a communication network comprising: a receiver arranged to receive the signal at the terminal; a determiner arranged to determine characteristics of the channel; a first encoder arranged to encode a first portion of the signal in accordance with a first encoding method to produce a first encoded signal portion; wherein the first portion is dependent on the determined characteristics of the channel; a second encoder arranged to encode a second portion of the signal in accordance with a second encoding method to produce a second encoded signal portion; and a transmitter arranged to transmit the first encoded signal portion and the second encoded signal portion via the channel.

BRIEF DESCRIPTION OF THE DRAWINGS

For a better understanding of the various embodiments and to show how the same may be carried into effect, the various embodiments will now be described with reference to the following drawings.

DETAILED DESCRIPTION

Figure 1:
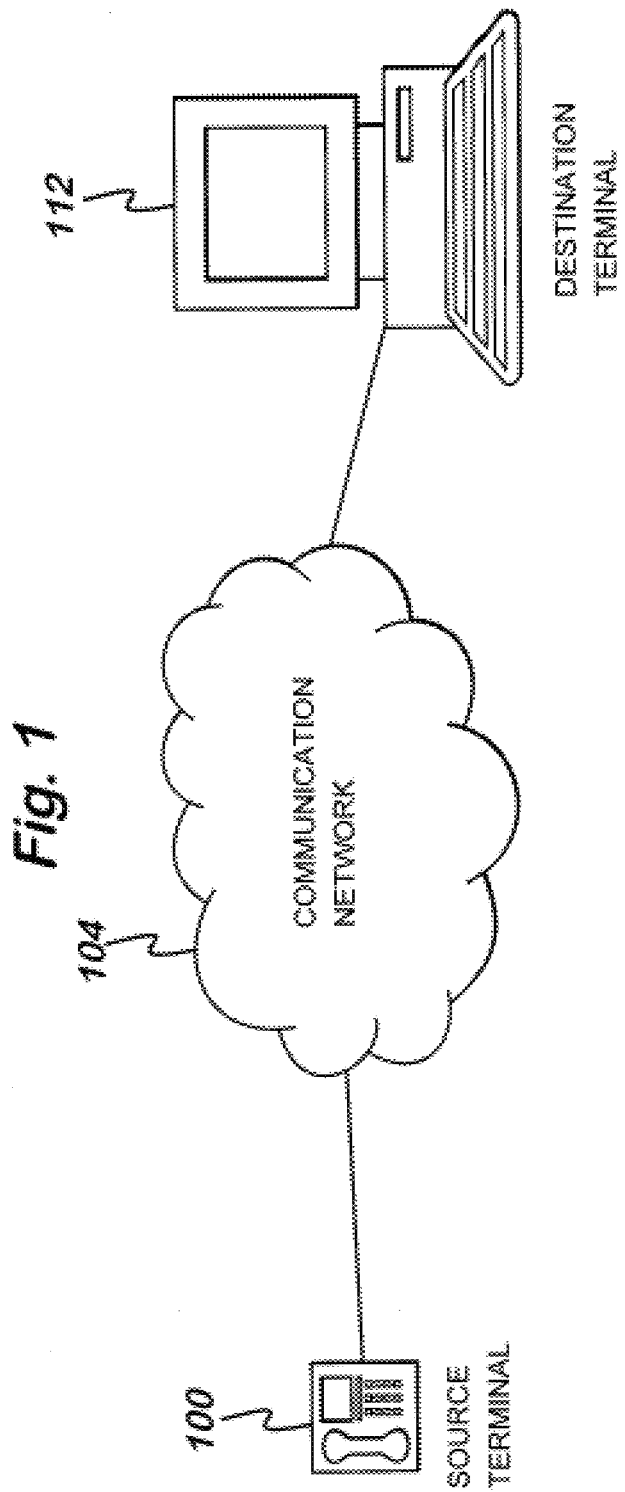
FIG. 1 is a diagram of a communication system.

Reference will first be made to FIG. 1, which shows a source terminal 100 and a destination terminal 112 connected to a communication network 104. The source terminal is arranged to transmit data to the destination terminal 112 via the communication network 104. In one embodiment of the invention the communications network is a VoIP network provided by the internet. It should be appreciated that even though the exemplifying communications system shown and described in more detail herein uses the terminology of a VoIP network, various embodiments can be used in any other suitable communication system that facilitates the transfer of data.

The terminals 100 and 112 may be, for example, a personal computer, a gaming device, a personal digital assistant, a suitably enabled mobile phone, a television or other device able to connect to the network 104.

In order to overcome channel degradations in the network 104, it is known to use parametric encoders which encode the parameters of a signal and transmit the parameters of the signal via the network. The parameters are reconstructed at a decoder of the destination terminal according to a model. Parametric model based encoding methods are particularly robust to degradations in the channel since a lost packet containing parameter information is relatively easily replaced.

Figure 2:
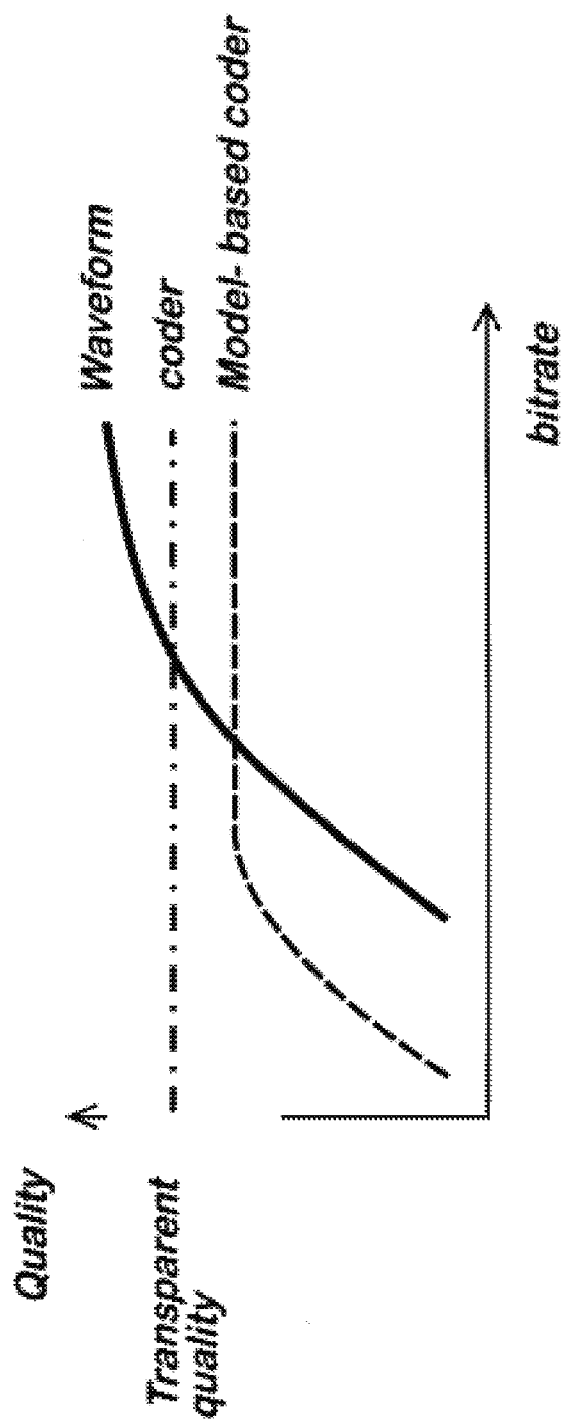
FIG. 2 is a graph showing the relative qualities of different encoding schemes.

Encoding schemes that are particularly robust to channel degradation, such as model based parametric encoders, limit the quality of the encoded signal. Even if the information transmitted in the signal is increased by increasing the bit rate of the encoder, the decoded signal will not reach transparent audio quality. The variation in signal quality with increasing bit rate for a model based encoder, is illustrated in FIG. 2. The signal quality for a waveform encoder which does not use a model based encoding method is also illustrated. As shown in FIG. 2 model based coders are superior to waveform encoders at lower bit rates, but do not converge towards transparent quality as the bit rate is increased.

Various embodiments compensate for the limited quality of robust encoding methods by encoding part of the signal with a high quality encoding method which does not use model based encoding methods.

According to an embodiment of the present invention a high quality non model based encoder and a robust model based encoder are used to encode different portions of a signal in dependence on the conditions of the channel used to transmit the signal. Accordingly during poor channel conditions the signal may be encoded such that the quality of the signal is not substantially affected by degradations in the channel quality. However when the conditions of the channel are good the quality of the signal may be enhanced by encoding part of the signal using a high quality non model based encoder.

One implementation of an embodiment of the present invention will now be described with reference to FIG. 3.

Figure 3:
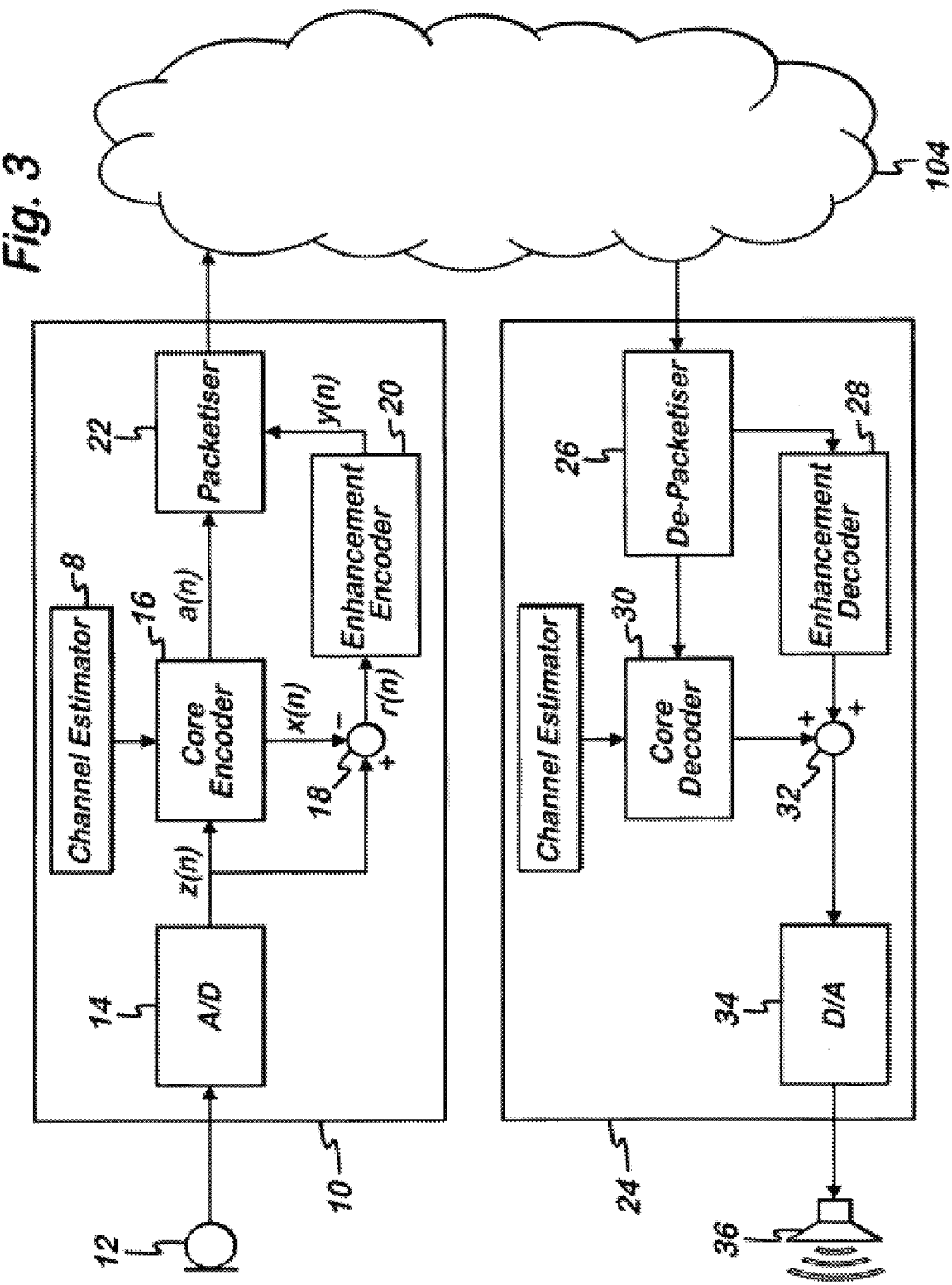
FIG. 3 is diagram of a receiver and a transmitter according to one embodiment.

FIG. 3 shows a signal transmitter 10 provided in the source terminal 100 and a signal receiver 24 provided in the destination terminal 112. It will be readily appreciated that the transmitter 10 and receiver 24 described may be present in both the source terminal and the destination terminal.

As shown in FIG. 3, the signal transmitter 10 includes an analogue to digital converter 14, a core encoder 16, an enhancement encoder 20, a channel estimation unit 8 and a packetiser 22.

In operation, analogue signals such as speech are input into the analogue to digital converter 14 from a microphone 12. The digital signals output from the analogue to digital converter 14 are input into a core encoder 16.

According to an embodiment of the invention the core encoder uses a model based parametric encoding method. In one embodiment of the invention the model based parametric encoding method provides a waveform approximation of the input.

The proportion of the signal to be encoded by the core encoder is dependent on the conditions of the channel. In one embodiment of the invention the conditions of the channel are estimated by the channel estimation unit 8. The channel estimation unit 8 may be arranged to estimate the available bandwidth of the channel. The channel estimation unit may determine the quality of the signal received at the destination terminal by information provided by the destination terminal 112. The information provided by the terminal 112 on the quality of the received signal may relate to information on packet loss and variations in signal propagation delay, otherwise referred to as jitter.

The enhancement encoder 20 is arranged to encode the portion of the signal not encoded by the core encoder. According to an embodiment of the invention the enhancement encoder 20 is arranged to use a high quality non model based encoding method to encode the part of the signal not encoded by the core encoder.

In one embodiment of the invention the encoding scheme used by the enhancement encoder is a waveform encoding scheme based on the Modified Discrete Cosine Transform (MDCT).

The channel estimation unit is arranged to report at least some of the channel parameters to the core encoder 16. Based on these parameters the core encoder 16 decides what proportion of the signal input from the analogue to digital converter 14 to encode.

In one embodiment of the invention the core encoder 16 applies an algorithm to the channel parameters to determine what proportion of the signal to encode at the core encoder. In an alternative embodiment of the invention predefined ranges are set for a channel parameter, such as bandwidth, to determine which range the parameter falls within. The core encoder is then arranged to encode a proportion of the signal which corresponds to the range to which the parameter belongs.

The signal input into the core encoder may be a frequency domain signal. In this case the portion of the signal encoded by the core and the enhancement encoder may be adjusted by adjusting the frequencies that are encoded by the core encoder and the enhancement encoder.

According to one embodiment of the invention the core encoder may select a cut off frequency $f_c$ above which the core encoder will not encode. By reducing the cut off frequency the portion of information that is contained in the encoded signal encoded by the core encoder is reduced.

The cut off frequency $f_c$ may be determined from channel characteristics such as: the amount of packet loss and amount of jitter as reported by the terminal 112, and from the bandwidth available in the channel. The inventors have found it particularly advantageous to set the cut off frequency high, such that a larger portion of the signal is encoded using the core encoder, when the channel characteristics indicate that the channel is of poor quality.

In one embodiment of the invention, the cut off frequency $f_c$ is adjusted to be proportional to a channel degradation indicator value. The channel degradation indicator is calculated to be proportional to a measure of packet loss and to a measure of jitter, and inversely proportional to the available bandwidth.

In one embodiment of the invention, the cut off frequency $f_c$ is proportional to the degree of packet loss and jitter only.

In one embodiment of the invention, the cut off frequency $f_c$ is proportional to the degree of packet loss only.

In one embodiment of the invention, the cut off frequency $f_c$ is proportional to the degree of jitter only.

In one embodiment of the invention, the cut off frequency $f_c$ is inversely proportional to the available bandwidth only.

After the core encoder 16 has encoded a portion of the signal defined by the cut of frequency the encoder is arranged to output the encoded signal a(n) to the packetiser 22.

The enhancement encoder is arranged to encode the remaining portion of the signal. In one embodiment of the invention the part of the signal not encoded by the core encoder may be determined by subtracting the information encoded by the core encoder from the signal output from the analogue to digital converter z(n) to generate a residual signal r(n). The information encoded by the encoder may be determined by partially or entirely decoding the encoded signal a(n) to generate a signal x(n).

As shown in FIG. 3, the core encoder 16 is arranged to output the signal x(n) indicating the information that has been encoded by the core encoder. The signal x(n) is provided to a mixer 18 where it is subtracted from the signal z(n) output from the analogue to digital converter 14.

In one embodiment of the invention the core encoder 16 will encode the frequencies below the cut off frequency according to the parametric encoding method. The frequencies above the cut off frequency $f_c$ may be encoded by the encoder as a series of zeros. The encoded signal is then either partially or entirely decoded to produce a signal x(n) which is subtracted from the signal z(n).

Encoding the signal at the encoder will remove some of the information from the signal z(n) which is encoded. Thus the decoded signal x(n) will contain less information than the signal z(n). As such when the signal x(n) is subtracted from the signal z(n) at the mixer 18 frequencies that were not encoded by the core encoder will be provided to the enhancement encoder in the residual signal r(n).

More specifically the residual signal r(n) will contain the original values of signal z(n) that are above the cut off frequency $f_c$ and additionally any information that was not encoded by the core encoder below the cut off frequency $f_c$, thereby accounting for the error of the core encoder.

The residual signal r(n) is encoded by the enhancement encoder using a high quality non model based encoding method. The signal y(n) encoded by the enhancement encoder is then output to the packetiser 22.

The packetiser 22 is arranged to input the encoded signals a(n) and y(n) received from the core encoder 16 and the enhancement encoder 20 respectively into the payloads of data packets. In one embodiment of the invention the encoded signal frames of the encoded signals a(n) and y(n) may be transmitted in the same payload of a data packet. In an alternative embodiment of the invention the separate data packets may be used to transmit frames of the encoded signals a(n) and y(n) respectively. Header information provided in the header of each data packet may indicate the encoding scheme used for the frames contained in the payload. The data packets may then be transmitted to the destination terminal 112 via the network 104.

Reference will now be made to the signal receiving circuitry 24 provided in the destination terminal 112, which is also shown in FIG. 3. The receiving circuitry comprises a core decoder 30, an enhancement decoder 28, a de-packetiser 26 and a digital to analog converter.

The data packets received by the terminal 112 are input into the de-packetiser 26 which is arranged to extract the encoded frames provided in the payload. Frames that were encoded by the core encoder may be identified by the packetiser using specific information provided in the header of the packet, or from parameters that may be extracted from the encoded frames.

The de-packetiser 26 is arranged to output encoded frames that were encoded by the core encoder to the core decoder 30. Similarly the de-packetiser is arranged to output encoded frames that were encoded by the enhancement encoder 20 to the enhancement decoder 28.

The core decoder is arranged to decode the signal received from the packetiser according to the encoding scheme used at the core encoder. The enhancement decoder is arranged to decode the signal received from the packetiser according to the encoding scheme used at the enhancement encoder.

The decoded signal output from the core decoder 30 is input into a mixer 32. Similarly, the decoded signal output from the enhancement decoder 28 is input to the mixer 32. At the mixer the decoded signals output from the core decoder and the enhancement decoder are combined. The output of the mixer is the reconstructed decoded digital signal.

The decoded digital signal output from the mixer 32 is then input into the digital to analogue converter 34 which converts the digital signal into an analogue signal. The analogue signal is then output to an output device such as a loudspeaker 36.

In an alternative embodiment of the invention the signal z(n) may be transformed into the Linear Prediction (LP) domain by applying Linear Predictive Coding (LPC) to the signal z(n) before it is encoded. This embodiment of the invention will be described with reference to FIG. 4.

LPC is a known method of analyzing speech signals. LPC analyses speech signals to produce a set of LP parameters and a LP residual signal. An LP domain signal is less sensitive to packet loss because it is possible to predict the parameters of a lost LP data packet.

Figure 4:
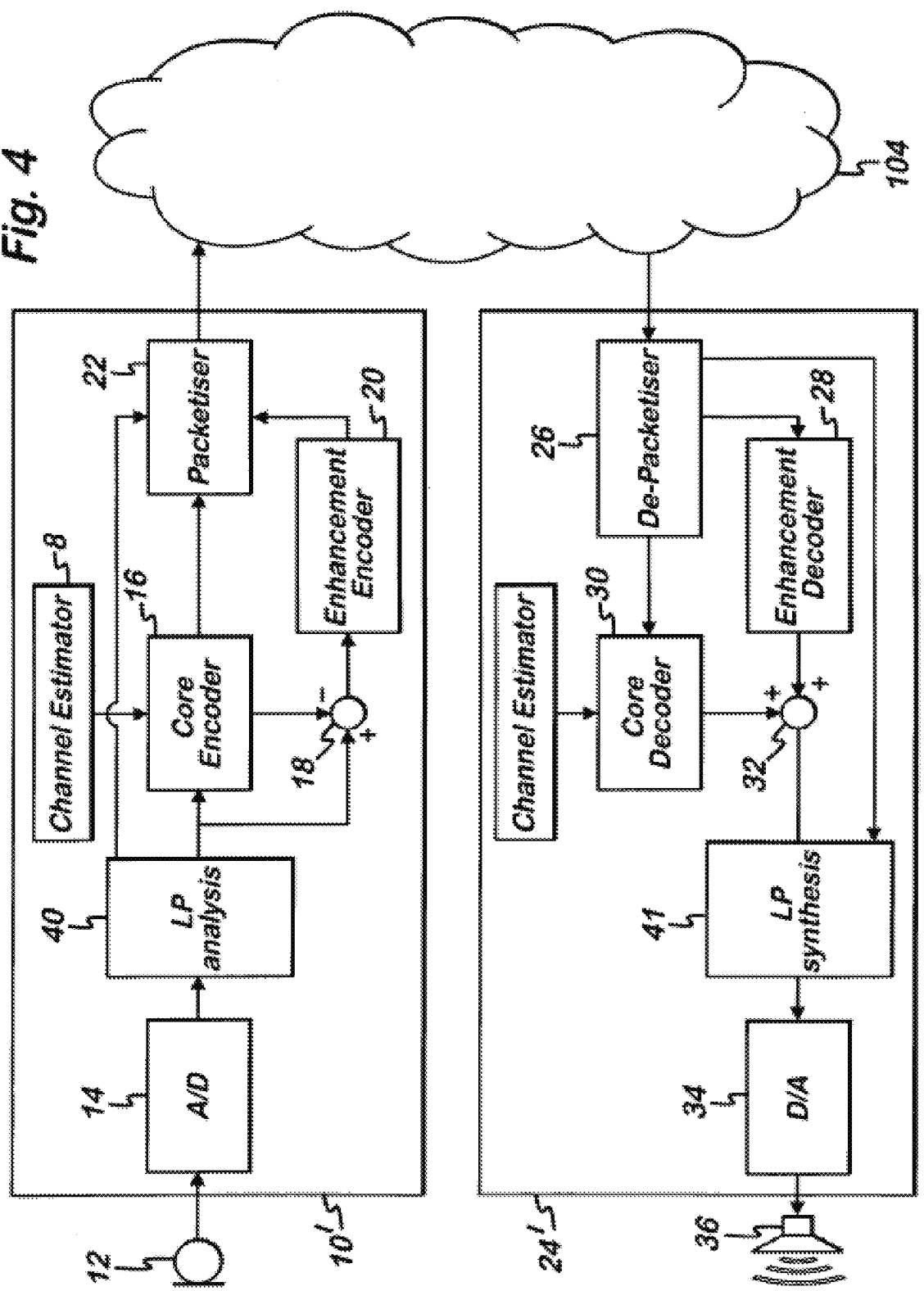
FIG. 4 is a diagram of a receiver and a transmitter according to an alternative embodiment.

FIG. 4 shows a schematic representation of a section of the transmitting circuitry 10' of the transmitting terminal 100 and a section of the receiving circuitry 24' of the receiving terminal 112. Components of the receiving and transmitting circuitry that were described in relation to FIG. 3 are referred to using like reference numerals.

As shown in FIG. 4, the signal z(n) output from the analogue to digital converter is input into an LP analysis filtering and coding block 40. The LP analysis filtering and coding block 40 generates a set of LP parameters and an LP residual signal z*(n). The LP parameters are output to the packetiser 22.

The LP residual signal z*(n) is input into the core encoder 16 and to the mixer 18. The core encoder encodes information in the LP residual signal z*(n) according to a model based encoding method that preferably provides a waveform approximation of the LP residual signal. The encoded signal a*(n) is output from the core encoder to the packetiser 22. The core encoder also outputs a signal x*(n) representative of the information in the LP residual signal that was encoded by the core encoder. The proportion of the information in the LP residual signal z*(n) that is encoded by the encoder may be controlled in dependence of the channel parameters as described previously.

The signal x*(n) is subtracted from the LP residual signal z*(n) at the mixer 18. This produces a residual signal r*(n) that is input into the enhancement encoder 20.

The enhancement encoder is arranged to encode the residual signal r*(n) according to a high quality non model based encoding scheme. The enhancement encoder outputs the encoded signal y*(n) to the packetiser 22.

The LP parameters and encoded signals a*(n) and y*(n) are transmitted in data packets via the network to the destination terminal 112. In one embodiment of the invention the LP parameters, and the signal frames of the encoded signals a*(n) and y*(n) may be combined in the payloads of the same packets. In an alternative embodiment of the invention the LP parameters, encoded signal frames of the signal a*(n) and encoded signal frames of the signal y*(n) may be transmitted in separate packets.

At the destination terminal the core decoder 30 is arranged to decode the encoded signal a*(n) according to the encoding scheme used in the core encoder 16. Similarly the enhancement decoder 28 is arranged to decode the encoded signal y*(n) according to the encoding scheme used in the enhancement encoder 20.

The decoded signals output from the core decoder and the enhancement decoder are combined to produce the LP residual signal. The LP residual signal and the LP parameters are input to an LP synthesis block 41 which is arranged to generate the digital signal z(n).

In an alternative embodiment of the invention the core encoder 16 only uses a waveform approximating encoding system when the signal includes voiced sounds. Voiced sounds may be detected using a sound classification method known in the art. When the sound is not classified as voiced the encoder may model the output as random white noise in combination with a spectral envelope.

In one embodiment of the invention the enhancement encoder may be switched off, thereby not producing an enhanced encoded signal y(n). The enhancement encoder may be switched off if it is determined that too much of the enhanced encoded signal, for example more than a threshold amount, was not received by the encoder. The enhancement encoder may be switched on again when channel conditions improve as detected by the channel estimation block 8.

In one embodiment of the invention the proportion of the signal that is encoded by the core encoder 16 may be adjusted by adjusting the number of bits available to the core encoder in relation to the number of bits available to the enhancement encoder. For a fixed bit rate, reducing the number of bits available to the core encoder will increase the number of bits available to the enhancement encoder, thus increasing the proportion of the signal encoded by the enhancement encoder.

In one embodiment of the invention the energy of the signal a(n) output from the core encoder is scaled in order to compensate for the enhancement encoder being switched on and off. The energy of the signal a(n) is multiplied by a scaling factor when the enhancement layer is off in order to maintain a correct signal energy.

In an embodiment of the invention the core encoder 16 uses an encoding scheme that does not employ inter-frame encoding methods. One example of interframe encoding is a method of encoding that determines the difference between two frames and transmits only the information of the difference between the frames. By using an encoding scheme that does not employ interframe encoding methods, a packet may be lost without significantly affecting the perceived quality of the received signal.

In an embodiment of the invention described above the signal r(t) input into the enhancement encoder includes the portion of signal not encoded by the core encoder due to the encoding error of the core encoder, and the portion of the signal falling outside the frequency range encoded by the core encoder. In an alternative embodiment of the invention the enhancement encoder may be arranged to encode only portions of the signal falling outside the frequency range encoded by the encoder. This may be achieved by explicitly dividing the frequency ranges of the signals input into the core encoder and the enhancement encoder. Alternatively the residual signal may be filtered to remove the frequencies encoded by the core encoder.

In one embodiment of the invention a set of cut off frequencies are used to define the portion of the signal encoded by the core encoder and the portion of the signal encoded by the enhancement encoder. For example two cut off frequencies may be used to define a range of frequencies to be encoded by the encoder. This range may be varied in accordance with the quality of the channel. If the channel quality is poor a smaller range of frequencies may be encoded by the enhancement encoder.

Alternatively more than one range may be defined by a plurality of cut off frequencies. These ranges may define frequency bands that are more important to transmit reliably than others. For example harmonic frequencies may be considered to be more important than other frequencies. According to this embodiment of the invention the characteristics of the signal may be analyzed to determine the harmonic frequencies in the signal. The cut off frequencies may then be set such that more harmonic frequencies are encoded by the core encoder when the channel degradation value is high. The enhancement encoder will then encode the remaining frequencies.

According to an alternative embodiment of the invention, when more than one frequency range is defined more than one enhancement encoder, or core encoder may be used to encode different ranges of frequencies.

In one alternative embodiment of the invention, an adjustable filter may be used to generate the residual signal instead of the mixer 18. According to this embodiment of the invention the core encoder is not arranged to output the signal x(n), instead the adjustable filter may be arranged to remove frequencies from the signal that are encoded by the core encoder to produce the residual signal. In the case where the core encoder encodes frequencies below a cut off frequency $f_c$, the adjustable filter may remove the frequencies below $f_c$ from the signal z(n) to produce the signal r(n) to be applied to the enhancement encoder.

While the various embodiments have been particularly shown and described with reference to the embodiments above, it will be understood to those skilled in the art that various changes in form and detail may be made without departing from the scope of the claimed subject matter.

The invention claimed is:

1. A method comprising:
   determining characteristics of a channel over which a signal is to be transmitted;
   encoding a first frequency portion of the signal using a first encoding method to produce a first encoded signal portion, the first frequency portion of the signal comprising a proportion of the signal that is calculated based on the determined characteristics of the channel, the calculated proportion being relatively higher when the determined characteristics of the channel indicate poor channel conditions than when the determined characteristics of the channel indicate good channel conditions, the first encoding method comprising a model based parametric encoding method;
   encoding a second frequency portion of the signal using a second encoding method to produce a second encoded signal portion, the second encoding method comprising a high quality non-model based encoding method, the second frequency portion of the channel comprising a remaining frequency portion of the channel that is not encoded by the first encoding method; and
   transmitting the first encoded signal portion and the second encoded signal portion via the channel.

2. The method of claim 1, wherein the second frequency portion of the signal is defined by at least one cut off frequency, and wherein the at least one cut off frequency is configured to be adjusted to be inversely proportional to available bandwidth of the channel.

3. The method of claim 1, wherein the second frequency portion of the signal is defined by at least one cut off frequency, and wherein the at least one cut off frequency is configured to be adjusted to be proportional to a measure of packet loss and a measure of jitter.

4. The method of claim 1, wherein the second frequency portion of the signal is defined by at least one cut off frequency, and wherein the at least one cut of frequency is configured to be adjusted to be proportional to a channel degradation indicator value.

5. The method of claim 4, wherein the channel degradation indicator value is determined from at least one of a measure of packet loss, a measure of jitter, or a measure of bandwidth of the channel.

6. The method of claim 1, further comprising determining the second frequency portion of the signal based on the first frequency portion of the signal.

7. The method of claim 1, wherein the second frequency portion of the signal is not encoded using the first encoding method.

8. The method of claim 1, wherein the characteristics of the channel correspond to at least one of a channel capacity, a channel bandwidth, a channel jitter, or a channel packet loss.

9. The method of claim 1, wherein the second frequency portion of the signal is defined by at least one cut off frequency, and wherein the at least one cut off frequency is configured to be adjusted to be proportional to at least one of a measure of packet loss or a measure of jitter.

10. A device comprising:
   a channel determiner configured to determine characteristics of a channel over which a signal is to be transmitted;
   a portion determiner configured to determine a first frequency portion of the signal based on the determined characteristics of the channel, the first frequency portion comprising a proportion of the signal that is calculated based on the determined characteristics of the channel, the calculated proportion being relatively higher when the determined characteristics of the channel indicate poor channel conditions than when the determined characteristics of the channel indicate good channel conditions;
   a core encoder configured to encode the first frequency portion of the signal using a model based encoding method to produce a first encoded signal portion;
   an enhancement encoder configured to encode a second frequency portion of the signal using a non-model based encoding method to produce a second encoded signal portion; and
   a transmitter configured to transmit the first encoded signal portion and the second encoded signal portion via the channel.

11. The device of claim 10, wherein the second frequency portion of the signal is defined by at least one cut off frequency, and wherein the at least one cut off frequency is further configured to be adjusted to be inversely proportional to available bandwidth of the channel.

12. The device of claim 10, wherein the second frequency portion of the signal is defined by at least one cut off frequency, and wherein the at least one cut off frequency is configured to be adjusted to be proportional to a measure of packet loss and a measure of jitter.

13. The device of claim 10, wherein the second frequency portion of the signal is defined by at least one cut off frequency, and wherein the at least one cut of frequency is configured to be adjusted to be proportional to a channel degradation indicator value.

14. The device of claim 13, wherein the channel degradation indicator value is determined from at least one of a measure of packet loss, a measure of jitter, or a measure of bandwidth of the channel.

15. The device of claim 10, wherein the characteristics of the channel correspond to at least one of a channel capacity, a channel bandwidth, a channel jitter, or a channel packet loss.

16. The device of claim 10, wherein the portion determiner is further configured to determine the second frequency portion of the signal based on the first frequency portion of the signal.

17. The device of claim 10, wherein the second frequency portion of the signal is not encoded using the model based encoding method.

18. The device of claim 10, wherein the first encoding method is a model based parametric encoding method.

19. The device of claim 10, wherein the second encoding method is a non-model based high quality encoding method.

20. The device of claim 10, wherein the second frequency portion of the signal is defined by at least one cut off frequency, and wherein the at least one cut off frequency is configured to be adjusted to be proportional to at least one of a measure of packet loss or a measure of jitter.

* * * * *